(12) United States Patent
Wang et al.

(10) Patent No.: US 11,513,365 B2
(45) Date of Patent: Nov. 29, 2022

(54) DESKTOP 3D DISPLAY SYSTEM AND DISPLAY METHOD

(71) Applicants: BEIHANG UNIVERSITY, Beijing (CN); SICHUAN UNIVERSITY, Chengdu (CN)

(72) Inventors: Qionghua Wang, Beijing (CN); Ling Luo, Chengdu (CN); Huan Deng, Chengdu (CN); Hui Ren, Chengdu (CN); Min Zhao, Chengdu (CN); Sai Li, Chengdu (CN)

(73) Assignees: BEIHANG UNIVERSITY, Beijing (CN); SICHUAN UNIVERSITY, Chengdu (CN)

( * ) Notice: Subject to any disclaimer, the term of this patent is extended or adjusted under 35 U.S.C. 154(b) by 297 days.

(21) Appl. No.: 16/765,145

(22) PCT Filed: Feb. 15, 2019

(86) PCT No.: PCT/CN2019/075250
§ 371 (c)(1),
(2) Date: May 18, 2020

(87) PCT Pub. No.: WO2020/024574
PCT Pub. Date: Feb. 6, 2020

(65) Prior Publication Data
US 2020/0348534 A1 Nov. 5, 2020

(30) Foreign Application Priority Data

Aug. 3, 2018 (CN) .......................... 201810876058.0

(51) Int. Cl.
*G02B 30/27* (2020.01)
*H04N 13/305* (2018.01)
(Continued)

(52) U.S. Cl.
CPC ............. *G02B 30/27* (2020.01); *G02B 30/54* (2020.01); *H04N 13/305* (2018.05); *H04N 13/398* (2018.05)

(58) Field of Classification Search
CPC ...... G02B 30/27; G02B 30/54; G02B 3/0056; G02B 5/0252; G02B 30/00; G02B 30/22;
(Continued)

(56) References Cited

U.S. PATENT DOCUMENTS 7,364,300 B2 * 4/2008 Favalora .............. H04N 13/388
353/7
7,446,733 B1 * 11/2008 Hirimai ................ G02B 3/0062
345/32
(Continued)

FOREIGN PATENT DOCUMENTS

CN 101281298 A 10/2008
CN 103163722 A 6/2013
(Continued)

OTHER PUBLICATIONS

International Search Report dated May 20, 2019, issued in International Application No. PCT/CN2019/075250, filed Feb. 15, 2019, 3 pages.
(Continued)

*Primary Examiner* — Jade R Chwasz
(74) *Attorney, Agent, or Firm* — Christensen O'Connor Johnson Kindness PLLC

(57) ABSTRACT

As disclosed herein, a desktop 3D display system is provided. A 2D image display module is used for receiving and displaying an integral imaging source. A viewing angle guide module is used for guiding light emitted from the integral imaging source. A light modulation module is arranged for modulating the light guided by the viewing angle guide module and reconstructing a 3D image. A
(Continued)

rotation module is configured to enable synchronous rotation of the 2D image display module, the view angle guide module and the light modulation module, wherein. A rotation angle speed of the synchronous rotation is associated with the switching speed of the integral imaging source of the 2D image display module. For a 3D image reconstructed in a single visual area range, crosstalk created by the diffuse reflective feature of pixels on a 3D image in other visual areas can be eliminated, thereby improving the viewing experience.

12 Claims, 6 Drawing Sheets

(51) Int. Cl.
*H04N 13/398* (2018.01)
*G02B 30/54* (2020.01)

(58) Field of Classification Search
CPC .... G02B 30/20; H04N 13/305; H04N 13/398; H04N 13/307; G09G 2320/0209; G09G 3/002; G09G 3/003; G03B 35/00
USPC ......................................................... 359/462
See application file for complete search history.

(56) References Cited

U.S. PATENT DOCUMENTS

| | | | |
|---|---|---|---|
| 8,698,966 | B2 | 4/2014 | Liu et al. |
| 2013/0176193 | A1* | 7/2013 | Liu ........................ G02B 30/54 345/31 |
| 2014/0204185 | A1* | 7/2014 | Liu ....................... H04N 13/351 348/54 |

FOREIGN PATENT DOCUMENTS

| | | |
|---|---|---|
| CN | 104113750 A | 10/2014 |
| CN | 105446472 A | 3/2016 |
| CN | 105657410 A | 6/2016 |
| CN | 107561722 A | 1/2018 |
| CN | 107608085 A | 1/2018 |
| CN | 108919503 A | 11/2018 |
| JP | 2007-256964 A | 10/2007 |
| WO | 2020/024574 A1 | 2/2020 |

OTHER PUBLICATIONS

Chinese First Search Report issued in Chinese Application No. 2018108760580, filed Aug. 3, 2018, 1 page.
Chinese First Office Action issued in Chinese Application No. 2018108760580, filed Aug. 3, 2018, 14 pages.

* cited by examiner

Horizontal Plane

DESKTOP 3D DISPLAY SYSTEM AND DISPLAY METHOD

CROSS-REFERENCE TO RELATED APPLICATION

The present disclosure claims the priority of Chinese Patent Application No. 2018108760580, titled "AN INTEGRAL IMAGING 360° DESKTOP 3D DISPLAY SYSTEM BASED ON A VIEWING ANGLE DIRECTING LAYER", filed on Aug. 3, 2018, the entire content of which is incorporated herein by reference.

TECHNICAL FIELD

The present disclosure relates to a desktop display technology, in particular, to a desktop 3D display system and a display method.

BACKGROUND

For an ideal desktop display, a complete image can be viewed within a range of 360° centered on a target scene. Therefore, a light emitted by pixels of the desktop display screen does not diverge toward the front like a conventional display screen, but deflect to a side of the display screen. A symmetry axis of a divergence angle of the light forms a certain angle with a normal direction of the display screen, such that the observers surrounding the desktop display screen are located in a middle position of the divergence angle of the light, so as to obtain a good viewing effect with a viewing angle of 360° in a horizontal direction. However, current desktop displays are mostly limited to 2D display, and unable to display 3D scenes.

SUMMARY

According to various embodiments disclosed by the present disclosure, a desktop 3D display system is provided. The display system includes: a 2D image display module configured to receive and display an integral imaging source; a viewing angle directing module provided on the 2D image display module and configured to direct a light emitted by the integral imaging source displayed on the 2D image display module; a light modulating module provided on the viewing angle directing module and configured to modulate the light directed by the viewing angle directing module and reconstruct a 3D image; wherein, the display system further includes a rotating module to enable the 2D image display module, the viewing angle directing module and the light modulating module to rotate synchronously, and a rotational angular speed of the synchronous rotation is associated with a switching speed of the integral imaging source displayed on the 2D image display module.

In one of the embodiments, the viewing angle directing module includes a viewing angle directing layer formed by arranging a plurality of directing units. The directing unit includes a modulating hole, an aperture and a lens hole. The modulating hole is configured to direct the light emitted by the integral imaging source displayed on the 2D image display module. The aperture and the lens hole are configured to cooperatively fix the light modulating module.

In one of the embodiments, an angle between an extending direction of a longitudinal axis of each modulating hole and a horizontal plane is an inclining angle θ.

In one of the embodiments, the directing unit is a platform-shaped hollow body having an upper end surface and a lower end surface, and an area of the upper end surface is less than an area of the lower end surface. The directing units are arranged in a convergent array.

In one of the embodiments, the integral imaging source consists of multiple-frame element image arrays. Each frame element image arrays corresponds to a 3D image information within the viewing area defined by a horizontal viewing angle $\theta_h$, and a vertical viewing angle θ.

In one of the embodiments, each frame element image array is generated by encoding a plurality of element images, each element image includes a portion of the 3D image information corresponding to the element image arrays.

In one of the embodiments, the light modulating module includes a lens array, the lens array includes a plurality of lenses arranged corresponding to the directing units.

In one of the embodiments, the aperture and the lens are closely attached at a contact interface.

In one of the embodiments, the light modulating module further includes a display optimizing module provided above the lens array, and configured to reproduce a complete continuous 3D image.

In one of the embodiments, the display optimizing module is a holographic functional screen.

In one of the embodiments, after the light emitted by the integral imaging source displayed on the 2D image display module is directed by the viewing angle directing module and is modulated by the light modulating module, the light is visible in the viewing area defined by the horizontal viewing angle $\theta_h$ and the vertical viewing angle $\theta_v$, and wherein the horizontal viewing angle $\theta_h$ and the vertical viewing angle $\theta_v$ respectively satisfy the following equations (1) and (2):

$$\theta_h = 2\arctan\frac{l\sin\theta}{2h} \quad (1)$$

$$\theta_v = \arctan\left(\frac{h}{(h/\tan\theta) - w/2}\right) - \arctan\left(\frac{h}{h/\tan\theta + w/2}\right) \quad (2)$$

wherein a length l and a width w of the modulating hole of the single directing unit are respectively constrained by the above equations (1) and (2). A height h of the modulating hole of the directing unit, a distance g from a principal plane of the lens array to an imaging plane of the 2D image display module, a pitch $p_1$ between the adjacent directing units, a thickness $p_0$ of a wall of the directing unit, and a diameter D of the lens in the lens array further satisfy:

$$h = g \quad (3)$$

$$p_1 - p_0 \geq D \quad (4).$$

In one of the embodiments, the number of the directing units is equal to or greater than the number of the element images of the element image arrays.

In one of the embodiments, the 2D image display module includes a projector and a receiving screen. The rotating module is provided outside a projection receiving area of the receiving screen.

In one of the embodiments, the 2D image display module includes a display screen. The rotating module is provided a side of the display screen away from the viewing angle directing module.

In one of the embodiments, the rotating module includes a rotary motor. A rotational speed of the rotary motor is greater than or equal to 24 revolutions per second.

According to an embodiment disclosed by the present disclosure, a desktop 3D display method is provided, which includes: receiving and displaying an integral imaging source on a 2D image display module; directing a light emitted by the integral imaging source via a viewing angle directing module; modulating the light directed by the viewing angle directing module and reconstructing a 3D image via a light modulating module; and rotating the 2D image display module, the viewing angle directing module and the light modulating module synchronously via a rotating module, wherein a rotational angular speed of the synchronous rotation is associated with a switching speed of the integral imaging source displayed on the 2D image display module.

According to the desktop 3D display system and the display method provided by the present disclosure, the integral imaging source consisted of multi-frame element image arrays in the 2D image display module emits light, and the light emitted by the 2D image display module is directed by the viewing angle directing module and then is modulated by the light modulating module, so that a target 3D image for the single viewing area is reconstructed within the area of the target display space. The rotating module drives the 2D image display module, the viewing angle directing module, and the light modulating module to rotate synchronously, such that the target 3D images of all viewing areas within a range of 360° in the horizontal direction are sequentially reproduced, so as to realize the integral imaging desktop 3D display with a viewing angle of 360° in the horizontal direction. The present disclosure further eliminates the crosstalk between the reconstructed 3D image within the single viewing area and 3D images in the other viewing areas caused by the diffuse reflectivity of the pixels, and improves the viewing experience of the integral imaging 360° desktop 3D display.

Figure 1:
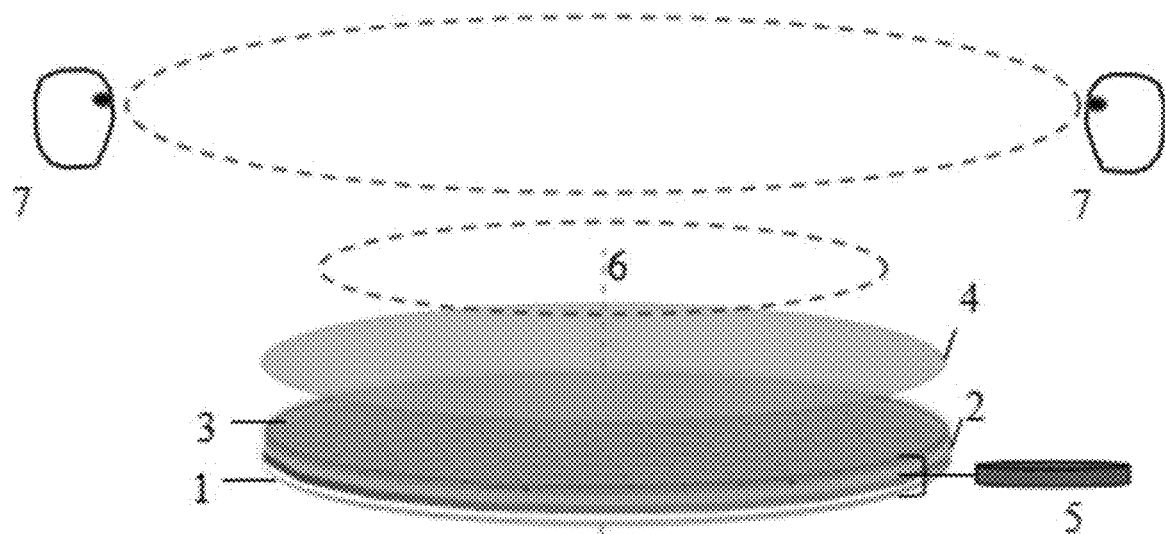
FIG. 1 is a structure diagram of a desktop 3D display system according to an embodiment of the present disclosure.

Reference Numerals in the above figures:

1—2D image display module, 2—viewing angle directing module, 3—light modulating module, 4—display optimizing module, 5—rotating module, 6—rotation axis, 7—viewer, 8—directing unit, 9—modulating hole, 10—aperture, 11—lens hole, 12—lens.

DETAILED DESCRIPTION OF THE EMBODIMENTS

For the convenience of understanding of the present disclosure, the present disclosure will be described more fully below with reference to relevant attached drawings. The drawings show optional embodiments of the present disclosure. However, the present disclosure can be implemented in many different forms and is not limited to the embodiments described herein. In contrast, the purpose of providing these embodiments is to provide a fully and thoroughly understanding of the disclosure of the present disclosure.

Unless defined otherwise, all technological and scientific terms used herein have the same meaning as commonly understood by one of those skilled in the art to which present disclosure belongs. The terms used herein in the specification of the present disclosure are only for describing specific embodiments, and are not intended to limit the present disclosure. The terms "and/or" used herein includes any and all combination of one or more associated listed items.

The azimuth terms "vertical", "horizontal", "upper", "lower" and the similar expressions used therein are only for illustration, and are not meant to be the one and only embodiment nor limitations on the present disclosure.

Hereinafter, a desktop 3D display system and a desktop 3D display method proposed by the present disclosure will be described in detail in conjunction with many embodiments disclosed by the present disclosure and the attached drawings.

FIG. 1 is a structural schematic view of a desktop 3D display system according to an embodiment of the present disclosure. The desktop 3D display system includes a 2D image display module 1, a viewing angle directing module 2, a light modulating module 3, and a rotating module 5. The 2D image display module 1, the viewing angle directing module 2, the light modulating module 3 are laminated sequentially. The rotating module 5 enables the 2D image display module 1, the viewing angle directing module 2, and the light modulating module 3 to rotate synchronously, which will be described in detail below.

The 2D image display module 1 may include a projector and a receiving screen, or alternatively include a display screen and the like, for receiving and displaying an integral imaging source.

In one embodiment, the receiving screen may be located on an object plane of a lens array of the light modulating module 3, and may have a distance of 13.5 mm away from the lens array. In one embodiment, the integral imaging source may be consisted of multi-frame element image arrays (for example, it may be a 360-frame element image arrays). Each frame element image arrays corresponds to 3D image information within a viewing area defined by a horizontal viewing angle $\theta_h$ and a vertical viewing angle $\theta_v$ on a specific angle within a range of 360° around the target object. For example, a high-speed projector may project the sequence of the element image arrays generated by encoding onto the receiving screen with a high refresh rate, where the refresh rate of the projector may be 10800 frames per second.

Each frame element image arrays may be generated by encoding a plurality of element images (for example, 21×21 element images). The plurality of element images may be arranged in any arrangement, such as a square array arrangement, as long as the plurality of element images can be encoded to generate the element image array. Each element image includes a portion of the 3D image information corresponding to the element image arrays. A sum of the 3D image information included in each of the element images constitutes the complete 3D image information included in each frame element image arrays. In an embodiment, the resolution of the element image may be 100×100 pixels, the size of the receiving screen may be 566 mm×566 mm, the size of the display pixel may be 0.13725 mm, and the display resolution may be 2160×2160 pixels.

Figure 2A:
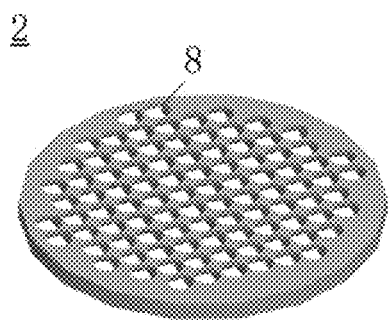
FIG. 2A is a structural schematic view of a viewing angle directing module according to an embodiment of the present disclosure.
Figure 2B:
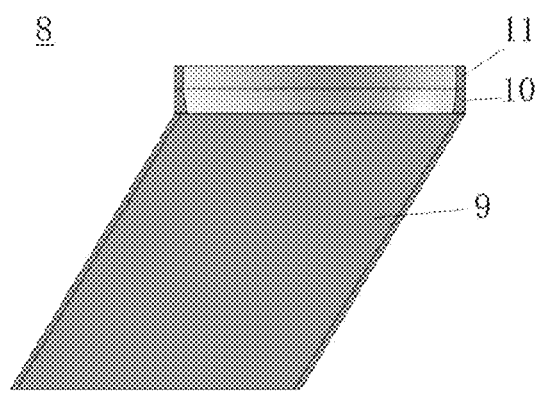
FIG. 2B is a side cross-sectional view of a directing unit of the viewing angle directing module as shown in FIG. 2A.
Figure 2C:
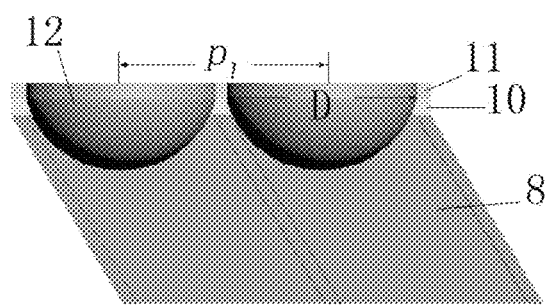
FIG. 2C is a side cross-sectional view of two adjacent directing units according to an embodiment of the present disclosure.
Figure 2D:
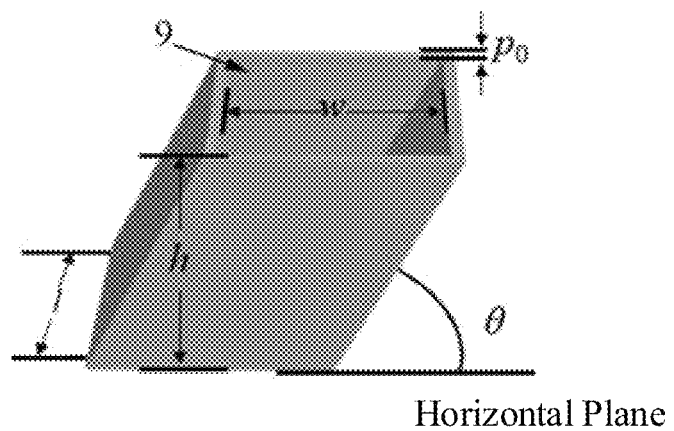
FIG. 2D is perspective view of a portion of the directing unit according to an embodiment of the present disclosure.

Referring to FIG. 1 and FIGS. 2A to 2D, the viewing angle directing module 2 includes a viewing angle directing layer and is located between the 2D image display module 1 and the light modulating module 3, for directing the light. The viewing angle directing layer includes a plurality of directing units 8. The plurality of directing units 8 may be arranged corresponding to the plurality of element images. As shown in FIG. 2B, each directing unit 8 includes a modulating hole 9, an aperture 10 and a lens hole 11, and the directing unit 8 is a hollow body opened at both ends. The modulating hole 9 is configured to direct the light. The aperture 10 and the lens hole 11 are configured to cooperatively fix the light modulating module 3 (such as lens 12). In one embodiment, the aperture 10 may be made of a transparent material, thereby reducing the loss of the quantity of the light transmission. In addition, in the embodiments as shown in FIGS. 2B and 2C, the aperture 10 and the lens 12 can be closely attached at a contact interface, thereby reducing the abrasion of the contact interface to the lens 12. In the embodiment as shown in FIG. 2D, the longitudinal extending direction of the modulating hole 9 of each directing unit 8 forms an angle θ with the horizontal plane, and each angle θ is the same. The cross-sectional shape of the modulating hole 9 in the horizontal direction may be a rectangular, a square, or a hexagonal, as long as it can be arranged in an arrangement corresponding to the plurality of element images, and the arrangement can completely propagate the light emitted by the 2D image display module.

The light modulating module 3 may include a lens array for modulating the light and reconstructing a 3D image within a viewing area of the display space. The lens array may include a plurality of lenses 12. In one embodiment, the plurality of lenses 12 may be arranged corresponding to the plurality of directing units 8 and these lenses have the same size. The projections of the plurality of lenses 12 on the horizontal plane may be circular or other shapes. In one embodiment, each lens may have a diameter of 12.7 mm and a focus length of 12.7 mm, the adjacent lenses 12 have a pitch of 13.7 mm. Each lens 12 corresponds to the element image covered by the directing unit 8. For example, the number of the lenses 12 included in each lens array may be the same as that of the element images, and both are 21×21.

Since there is gap between the lenses 12 in the lens array of the light modulating module 3, one or more black strips may exist in the 3D image formed by the light modulated by the lens array. Therefore, the light modulating module 3 may further include a display optimizing module 4 provided above the lens array, so as to generate a 3D image with smooth continuous parallax. The display optimizing module 4 may be a holographic functional screen, which may have a light diffusion effect to generate the 3D image with smooth continuous parallax. In one embodiment, the display optimizing module 4 is located above the lens array by 155 mm, and has a size of 566 mm×566 mm.

The arrangement of the element images, the lenses 12 or the directing units 8 may be an orthogonal arrangement, a honeycomb arrangement or circular outward diffusing arrangement, as long as the lower end surfaces of the directing unit 8 is aligned with the corresponding element image, and the upper end surfaces of the directing units 8 or the outward end surfaces of the lens holes 11 is aligned with the outward end surface of the lenses 12, which are not limited hereto. Moreover, in an embodiment, the directing unit 8 may be a platform-shaped hollow body whose upper end surface has a less area than a lower end surface area thereof. Therefore, the arrangement of the directing units 8 may also be a convergent array arrangement whose upper end surfaces are gathered toward the center, that is, the lower end surfaces of the directing units 8 correspond to the element images, and the upper end surfaces thereof are gathered radially toward the center.

In an embodiment as shown in FIG. 1, the rotating module 5 is configured to rotate the 2D image display module 1, the viewing angle directing module 2, the light modulating module 3 about a rotation axis 6 synchronously, which will not affect the display of the element image arrays of the 2D image display module 1. For example, in an embodiment, when the 2D image display module 1 is a projector and a receiving screen, the rotating module 5 is provided outside a projection receiving area of the receiving screen. Alternatively, in another embodiment, when the 2D image display module 1 is a display screen, the rotating module 5 may be provided a side of the display screen away from the viewing angle directing module 2, thus ensuring that the light emitted by the 2D image display module 1 will not be disturbed.

A rotational angular speed of the rotating module 5 is associated with a switching speed of the element image arrays of the 2D image display module 1, so as to achieve an integrated 360° desktop 3D display.

In particular, in the above embodiment, the angular speed may be a product of the rotational speed of the rotating module 5 and the number of the element image arrays of the integral imaging source. For example, when the rotational speed of the rotating module 5 is 24 rev/sec (i.e. the system rotates 24 revolutions per second, one revolution means a rotation of a complete 360°), and the integral imaging source has 360-frame element image arrays (i.e. the system switches one frame element image arrays every 1° of the rotation), then the rotational angular speed is 8640°/sec.

In one embodiment, the rotating module 5 may include a rotary motor to enable the 2D image display module 1, the viewing angle directing module 2 and the light modulating module 3 to rotate synchronously, so as to reconstruct the corresponding 3D image in each viewing area in sequence, and constitute a 360° horizontal viewing area, thereby realizing a 360° integral imaging desktop 3D display in a horizontal direction, such that the viewer 7 can observe the corresponding 3D image from the viewing angle in the viewing area. In one embodiment, the rotational speed R of the rotary motor should meet R≥24 rev/sec (r/s), preferably 30 rev/sec, to ensure that the viewer 7 can observe a 360° continuous 3D image of the target 3D scene.

Preferably, the element images in the element image arrays, the modulating holes 9 of the directing units 8 in the viewing angle directing layer, and the lenses 12 in the lens array correspond completely on the light path. In other words, all the light emitted by each of element images in the element image arrays can sequentially pass through the corresponding modulating holes 9 of the directing units 8 in the viewing angle directing layer and the corresponding lenses 12 in the lens array.

Figure 3A:
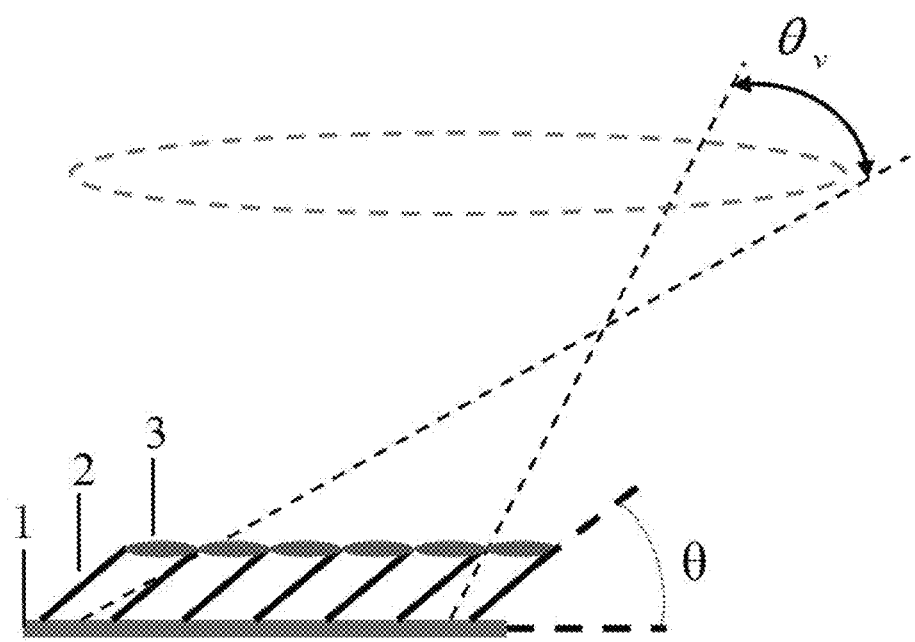
FIG. 3A is a schematic view of a modulation principle of the viewing angle in vertical direction according to an embodiment of the present disclosure.
Figure 3B:
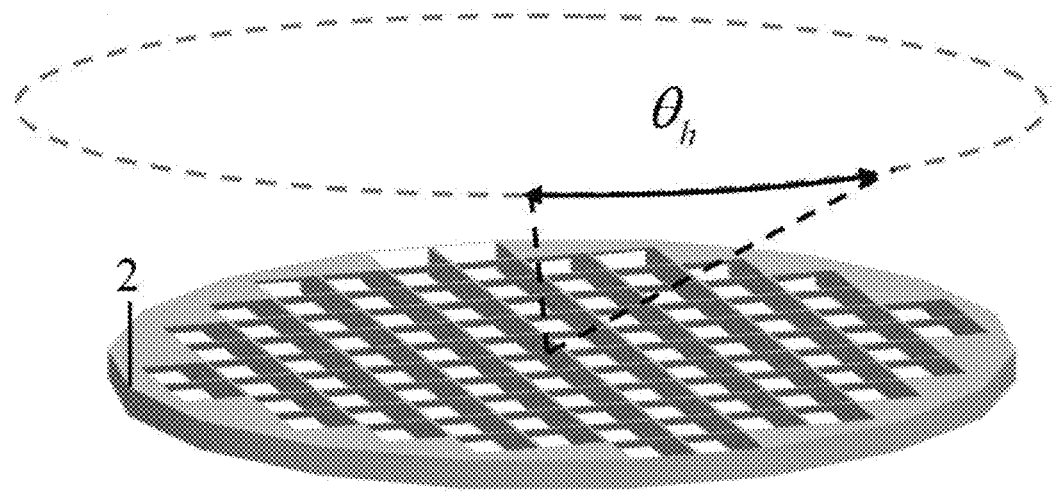
FIG. 3B is a schematic view of a modulation principle of the viewing angle in horizontal direction according to an embodiment of the present disclosure.
Figure 3C:
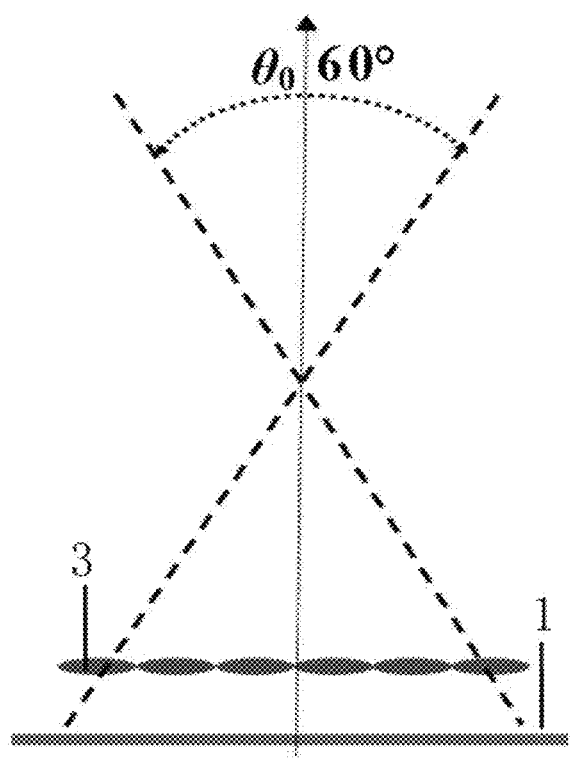
FIG. 3C is a schematic view of a modulation of the viewing angle of an integral imaging without using a viewing angle directing layer.

FIGS. 3A and 3B are schematic views of a modulation principle of the light directed by the directing units 8 in the viewing angle directing layer. FIG. 3A shows a schematic view of a modulation principle in the range defined by the viewing angle $\theta_v$ in a vertical direction according to an embodiment of the present disclosure. FIG. 3B shows a schematic view of a modulation principle in the viewing range defined by the viewing angle $\theta_h$ in a horizontal direction according to an embodiment of the present disclosure. FIG. 3C shows a schematic view of a modulation principle in the range defined by the viewing angle $\theta_0$ of the integral imaging without using the viewing angle directing layer in the conventional technologies.

In one embodiment, the number of the directing units 8 may be equal to or greater than the number of the element images of the element image arrays, as long as the light emitted by all the element images can be directed by the directing units 8, such that the crosstalk in the integral imaging desktop display system is eliminated. Since the light emitted by the element image arrays can only be emitted in an inclining direction of the directing unit 8, the directing unit 8 can direct the light. Then, after the directed light is modulated by the light modulating module 3, the light of the display system is visible in the viewing area defined by the horizontal viewing angle $\theta_h$ and the vertical viewing angle $\theta_v$. The horizontal viewing angle $\theta_h$ and the vertical viewing angle $\theta_v$ respectively satisfy the following equations:

$$\theta_h = 2\arctan\frac{l\sin\theta}{2h}, \quad (1)$$

$$\theta_v = \arctan\left(\frac{h}{(h/\tan\theta) - w/2}\right) - \arctan\left(\frac{h}{h/\tan\theta + w/2}\right), \quad (2)$$

wherein a length l and a width w of the modulating hole 9 of the single directing unit 8 are respectively constrained by the above equations (1) and (2). A height h of the modulating hole 9 of the directing unit 8, a distance g from the principal plane of the lens array to the imaging plane of the 2D image display module 1, a pitch $p_1$ between the adjacent directing units 8, a thickness $p_0$ of a wall of the directing unit 8, and the diameter D of the lens in the lens array satisfy:

$$h = g \quad (3)$$

$$p_1 - p_0 \geq D \quad (4).$$

For example, in one embodiment, the length l, the width w and the height h of the modulating hole 9 of the directing unit 8 are respectively specified as 13.1 mm, 13.1 mm and 13.5 mm, and $\theta=60°$, the horizontal viewing angle $\theta_h$ of the light respectively emitted by the element image arrays and then modulated by the light modulating module 3 is approximately 44°, and the vertical viewing angle $\theta_v$ thereof is approximately 41°. At the same time, as shown in FIG. 2C, the pitch $p_1$ between the adjacent directing units 8 is 13.7 mm, the thickness $p_0$ of the wall of the directing unit 8 is 0.6 mm. As shown in FIGS. 3A to 3B, the light directed by the viewing angle directing layer and modulated by the light modulating module 3 is visible in viewing area defined by the viewing angle $\theta_h=44°$ in the horizontal direction in single viewing area, such that the crosstalk between the element image arrays in the single viewing area and the other viewing areas, caused by diffuse reflectivity of the pixels, is eliminated. Moreover, compared with the conventional display system without the viewing angle directing module 2, the vertical viewing angle of the single viewing area of the display system with the viewing angle directing module 2 is modulated from a range of $$90° - \frac{\theta_0}{2} \text{ to } 90° + \frac{\theta_0}{2}$$

in front of the receiving screen to a range of $$\theta - \frac{\theta_v}{2} \text{ to } \theta + \frac{\theta_v}{2}.$$

In particular, in an embodiment of the prior art shown in FIG. 3C, when $\theta_0=60°$, the viewing angle of the reconstructed 3D image in the vertical direction from a plane in which the receiving screen is located ranges from 60° to 120°. However, in the embodiment of the present disclosure in FIG. 3A, by a modulation of the display system of the present disclosure, the viewing angle of the reconstructed 3D image in the vertical direction from a plane in which the receiving screen is located is modulated to have a range from 39.5° to 80.5°.

According to the desktop 3D display system described by the present disclosure, first, the 2D image display module 1 emits a light of the integral imaging source consisted of multi-frame element image arrays. Then, the light emitted by the element image arrays is directed by the viewing angle directing module 2 and then is modulated by the lens array of the light modulating module 3, so that a target 3D image for the single viewing area is reconstructed within the viewing area of the target display space. The rotating module 5 drives the 2D image display module 1, the viewing angle directing module 2, and the light modulating module 3 to rotate synchronously, the target 3D images of all viewing areas within a range of 360° in the horizontal direction are respectively and sequentially reproduced, so as to realize the integral imaging desktop 3D display with a viewing angle of 360° in the horizontal direction. The display system eliminates the crosstalk caused by the diffuse reflectivity of the pixels, improves the viewing experience of the integral imaging 360° desktop 3D display.

Figure 4:
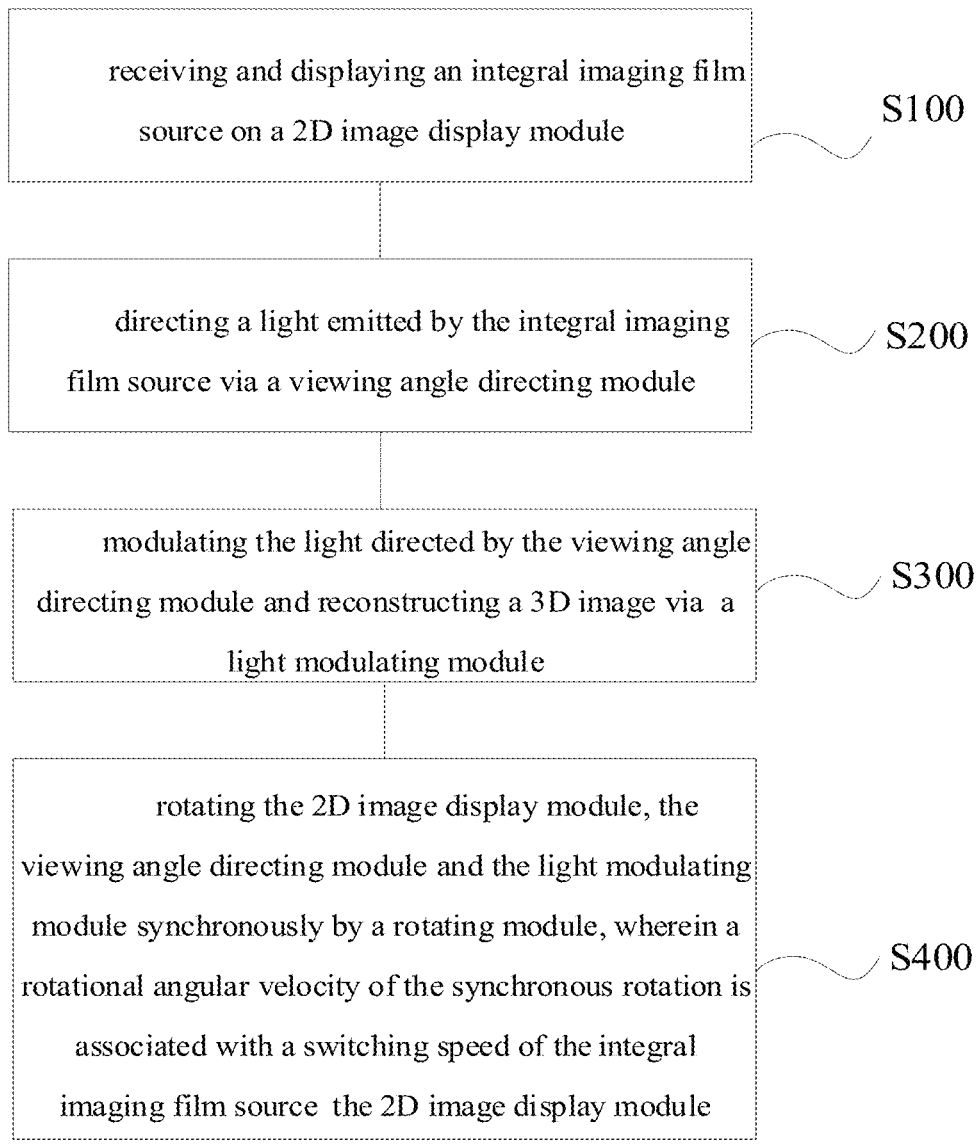
FIG. 4 is a desktop 3D display method according to an embodiment of the present disclosure.

Referring to FIG. 4, a desktop 3D display method is provided. The method includes the flowing steps.

In step S100, a 2D image display module 1 receives and displays an integral imaging source.

Here, the 2D image display module and the integral imaging source have the same features as those of the 2D image display module and the integral imaging source in the above system, and the redundant description thereof will not be made herein.

In step S200, a viewing angle directing module 2 directs a light emitted by the integral imaging source.

Here, the viewing angle directing module 2 has the same features as those of viewing angle directing module 2 in the above system, and the redundant description thereof will not be made herein.

In step S300, a light modulating module 3 modulates the light directed by the viewing angle directing module 2, and reconstructs a 3D image.

Here, the light modulating module 3 has the same features as those of the light modulating module 3 in the above system, and the redundant description thereof will not be made herein.

In step S400, a rotating module 5 rotates the 2D image display module 1, the viewing angle directing module 2 and the light modulating module 3 synchronously. A rotational angular speed of the synchronous rotation is associated with a switching speed of the integral imaging source of the 2D image display module.

Here, the rotating module 5, the rotational angular speed and the switching speed of the integral imaging source have the same features as those of the rotating module 5, the rotational angular speed and the switching speed of the integral imaging source in the above system, and the redundant description thereof will not be made herein.

According to the desktop 3D display method described by the present disclosure, first, the 2D image display module 1 emits a light of the integral imaging source consisted of multi-frame element image arrays. Then, the light emitted by the element image arrays is directed by the viewing angle directing module 2 and then is modulated by the lens array of the light modulating module 3, so that a target 3D image for the single viewing area is reconstructed within the viewing area of the target display space. The rotating module 5 drives the 2D image display module 1, the viewing angle directing module 2 and the light modulating module 3 to rotate synchronously, the target 3D images of all viewing areas within a range of 360° in the horizontal direction are respectively and sequentially reproduced, so as to realize the integral imaging desktop 3D display with a viewing angle of 360° in the horizontal direction. The display system eliminates the crosstalk caused by the diffuse reflectivity of the pixels, improves the viewing experience of the integral imaging 360° desktop 3D display.

Each technical features of the embodiments described above can be arbitrarily combined. In order to simplify the description, all possible combinations of each technical features in the above embodiments have not been described. However, as long as there is no contradiction in the combination of these technical features, it should be considered as that all of them fall within the scope recorded in this specification.

The above described embodiments only present several implementation manners of the present disclosure, and descriptions thereof are more specific and detailed, but they cannot be understood as limiting the scope of the application patent. It should be noted that, to those of ordinary skill in the art, several modifications and improvements can be made without departing from the concept of the present disclosure, which all fall within the protection scope of the present disclosure. Therefore, the protection scope of this application patent shall be subject to the appended claims.

What is claimed is:

1. A desktop 3D display system, comprising:
a 2D image display module configured to receive and display an integral imaging source;
a viewing angle directing module provided on the 2D image display module and configured to direct a light emitted by the integral imaging source displayed on the 2D image display module;
a light modulating module provided on the viewing angle directing module and configured to modulate the light directed by the viewing angle directing module and reconstruct a 3D image;
wherein the display system further comprises a rotating module to enable the 2D image display module, the viewing angle directing module, and the light modulating module to rotate synchronously, and a rotational angular speed of the synchronous rotation is associated with a switching speed of the integral imaging source displayed on the 2D image display module;

wherein the viewing angle directing module comprises a viewing angle directing layer formed by arranging a plurality of directing units, the directing unit comprises a modulating hole, an aperture, and a lens hole, the modulating hole is configured to direct the light emitted by the integral imaging source displayed on the 2D image display module, the aperture and the lens hole are configured to cooperatively fix the light modulating module;

wherein the integral imaging source consists of multiple-frame element image arrays; each frame element image array corresponds to a 3D image information within a viewing area defined by a horizontal viewing angle $\theta_h$ and a vertical viewing angle $\theta_v$;

wherein each frame element image array is generated by encoding a plurality of element images; each element image comprises a portion of the 3D image information corresponding to the element image arrays;

wherein the light modulating module comprises a lens array; the lens array comprises a plurality of lenses arranged corresponding to the directing units; and wherein the light modulating module further comprises a display optimizing module provided above the lens array and configured to reproduce a complete continuous 3D image.

2. The desktop 3D display system according to claim 1, wherein an angle between an extending direction of a longitudinal axis of each modulating hole and a horizontal plane is an inclining angle $\theta$.

3. The desktop 3D display system according to claim 1, wherein the directing unit is a platform-shaped hollow body having an upper end surface and a lower end surface, and an area of the upper end surface is less than an area of the lower end surface, the directing units are arranged in a convergent array.

4. The desktop 3D display system according to claim 1, wherein the aperture and the lens are closely attached at a contact interface.

5. The desktop 3D display system according to claim 1, wherein the display optimizing module is a holographic functional screen.

6. The desktop 3D display system according to claim 1, wherein after the light emitted by the integral imaging source displayed on the 2D image display module is directed by the viewing angle directing module and is modulated by the light modulating module; the light is visible in the viewing area defined by the horizontal viewing angle $\theta_h$ and the vertical viewing angle $\theta_v$, wherein the horizontal viewing angle $\theta_h$ and the vertical viewing angle $\theta_v$ respectively satisfy the following equations (1) and (2):

$$\theta_h = 2\arctan\frac{l\sin\theta}{2h} \qquad (1)$$

$$\theta_v = \arctan\left(\frac{h}{(h/\tan\theta) - w/2}\right) - \arctan\left(\frac{h}{h/\tan\theta + w/2}\right) \qquad (2)$$

wherein a length l and a width w of the modulating hole of the single directing unit are respectively constrained by the above equations (1) and (2), a height h of the modulating hole of the directing unit, a distance g from a principal plane of the lens array to an imaging plane of the 2D image display module, a pitch $p_1$ between the adjacent directing units, a thickness $p_0$ of a wall of the directing unit, and a diameter D of the lens in the lens array further satisfy:

$$h = g \tag{3}$$

$$p_1 - p_0 \geq D \tag{4}$$

7. The desktop 3D display system according to claim 1, wherein the number of the directing units is equal to or greater than the number of the element images of the element image arrays.

8. The desktop 3D display system according to claim 1, wherein the 2D image display module comprises a projector and a receiving screen, the rotating module is provided outside a projection receiving area of the receiving screen.

9. The desktop 3D display system according to claim 1, wherein the 2D image display module comprises a display screen, the rotating module is provided a side of the display screen away from the viewing angle directing module.

10. The desktop 3D display system according to claim 1, wherein the rotating module comprises a rotary motor; a rotational speed of the rotary motor is greater than or equal to 24 revolutions per second.

11. A desktop 3D display method, comprising:
receiving and displaying an integral imaging source on a 2D image display module;
directing a light emitted by the integral imaging source via a viewing angle directing module;
modulating the light directed by the viewing angle directing module and reconstructing a 3D image via a light modulating module;
rotating the 2D image display module, the viewing angle directing module, and the light modulating module synchronously via a rotating module, wherein a rotational angular speed of the synchronous rotation is associated with a switching speed of the integral imaging source displayed on the 2D image display module;
directing the light emitted by the integral imaging source displayed on the 2D image display module via a modulating hole of a viewing angle directing layer of the viewing angle directing module that is formed by arranging a plurality of directing units, the directing unit comprising the modulating hole, an aperture, and a lens hole, wherein the aperture and the lens hole are configured to cooperatively fix the light modulating module;
wherein the integral imaging source consists of multiple-frame element image arrays; each frame element image array corresponds to a 3D image information within a viewing area defined by a horizontal viewing angle $\theta_h$ and a vertical viewing angle $\theta_v$;
wherein each frame element image array is generated by encoding a plurality of element images; each element image comprises a portion of the 3D image information corresponding to the element image arrays;
wherein the light modulating module comprises a lens array; the lens array comprises a plurality of lenses arranged corresponding to the directing units; and
wherein the light modulating module further comprises a display optimizing module provided above the lens array and configured to reproduce a complete continuous 3D image.

12. A desktop 3D display system, comprising:
a 2D image display module configured to receive and display an integral imaging source;
a viewing angle directing module provided on the 2D image display module and configured to direct a light emitted by the integral imaging source displayed on the 2D image display module;
a light modulating module provided on the viewing angle directing module and configured to modulate the light directed by the viewing angle directing module and reconstruct a 3D image;
wherein the display system further comprises a rotating module to enable the 2D image display module, the viewing angle directing module, and the light modulating module to rotate synchronously, and a rotational angular speed of the synchronous rotation is associated with a switching speed of the integral imaging source displayed on the 2D image display module;
wherein the viewing angle directing module comprises a viewing angle directing layer formed by arranging a plurality of directing units, the directing unit comprises a modulating hole, a aperture, and a lens hole, the modulating hole is configured to direct the light emitted by the integral imaging source displayed on the 2D image display module, the aperture and the lens hole are configured to cooperatively fix the light modulating module;
wherein the integral imaging source consists of multiple-frame element image arrays; each frame element image arrays corresponds to a 3D image information within a viewing area defined by a horizontal viewing angle $\theta_h$ and a vertical viewing angle $\theta_v$;
wherein each frame element image array is generated by encoding a plurality of element images; each element image comprises a portion of the 3D image information corresponding to the element image arrays;
wherein the light modulating module comprises a lens array; the lens array comprises a plurality of lenses arranged corresponding to the directing units; and
wherein after the light emitted by the integral imaging source displayed on the 2D image display module is directed by the viewing angle directing module and is modulated by the light modulating module; the light is visible in the viewing area defined by the horizontal viewing angle $\theta_h$ and the vertical viewing angle $\theta_v$, wherein the horizontal viewing angle $\theta_h$ and the vertical viewing angle $\theta_v$ respectively satisfy the following equations (1) and (2):

$$\theta_h = 2\arctan\frac{l\sin\theta}{2h} \tag{1}$$

$$\theta_v = \arctan\left(\frac{h}{(h/\tan\theta) - w/2}\right) - \arctan\left(\frac{h}{h/\tan\theta + w/2}\right) \tag{2}$$

wherein a length l and a width w of the modulating hole of the single directing unit are respectively constrained by the above equations (1) and (2), a height h of the modulating hole of the directing unit, a distance g from a principal plane of the lens array to an imaging plane of the 2D image display module, a pitch $p_1$ between the adjacent directing units, a thickness $p_0$ of a wall of the directing unit, and a diameter D of the lens in the lens array further satisfy:

$$h = g \tag{3}$$

$$p_1 - p_0 \geq D \tag{4}$$

* * * * *